United States Patent
Zhao et al.

(10) Patent No.: US 12,192,959 B2
(45) Date of Patent: Jan. 7, 2025

(54) METHOD EXECUTED BY USER EQUIPMENT, AND USER EQUIPMENT

(71) Applicant: SHARP KABUSHIKI KAISHA, Sakai (JP)

(72) Inventors: Yinan Zhao, Shanghai (CN); Renmao Liu, Shanghai (CN); Chao Luo, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 574 days.

(21) Appl. No.: 17/416,652

(22) PCT Filed: Dec. 18, 2019

(86) PCT No.: PCT/CN2019/126311
§ 371 (c)(1),
(2) Date: Aug. 4, 2021

(87) PCT Pub. No.: WO2020/125679
PCT Pub. Date: Jun. 25, 2020

(65) Prior Publication Data
US 2022/0046598 A1 Feb. 10, 2022

(30) Foreign Application Priority Data

Dec. 21, 2018 (CN) .......................... 201811579267.5

(51) Int. Cl.
*H04W 72/04* (2023.01)
*H04L 5/14* (2006.01)
(Continued)

(52) U.S. Cl.
CPC ............ *H04W 72/02* (2013.01); *H04L 5/143* (2013.01); *H04W 48/10* (2013.01); *H04W 72/044* (2013.01); *H04W 72/20* (2023.01)

(58) Field of Classification Search
CPC ..... H04L 5/0053; H04L 5/005; H04L 5/0082; H04L 5/0091; H04L 5/0094; H04L 5/143;
(Continued)

(56) References Cited

U.S. PATENT DOCUMENTS

2015/0319746 A1* 11/2015 Lu .......................... H04L 1/1812
370/280
2016/0295391 A1* 10/2016 Sartori .................. H04W 8/005
(Continued)

FOREIGN PATENT DOCUMENTS

| CN | 105451211 A | 3/2016 |
| CN | 107852690 A | 3/2018 |

(Continued)

OTHER PUBLICATIONS

MCC Support, Final Report of 3GPP TSG RAN WG1 #94 v1.0. 0(Gothenburg, Sweden, Aug. 20-24, 2018), 3GPP TSG RAN WG1 Meeting #94bis, R1-1810051, Section 7.2.4.1.3, Chengdu, China, Oct. 8-12, 2018.

(Continued)

*Primary Examiner* — Phuc H Tran
(74) *Attorney, Agent, or Firm* — ScienBiziP, P.C.

(57) ABSTRACT

The present disclosure provides a method executed by a user equipment, and a user equipment. The method includes receiving system information from a base station, the system information including time division duplexing (TDD) configuration information; and transmitting sidelink communication system information including sidelink TDD configuration information.

12 Claims, 3 Drawing Sheets

(51) Int. Cl.
*H04W 48/10* (2009.01)
*H04W 72/02* (2009.01)
*H04W 72/044* (2023.01)
*H04W 72/20* (2023.01)

(58) Field of Classification Search
CPC .............. H04L 5/1469; H04W 48/10; H04W 72/0446; H04W 72/23; H04W 92/18; H04W 4/44; H04W 48/12; H04W 56/0015; H04W 72/02; H04W 72/044; H04W 72/20; H04J 11/0073; H04J 11/0076; H04J 2011/0096
See application file for complete search history.

(56) References Cited

U.S. PATENT DOCUMENTS

| | | | |
|---|---|---|---|
| 2017/0230959 A1* | 8/2017 | Wu | .............. H04W 72/02 |
| 2018/0098322 A1 | 4/2018 | Yoon | |
| 2018/0234928 A1 | 8/2018 | Yasukawa et al. | |
| 2020/0045697 A1* | 2/2020 | Choi | .............. H04W 72/0446 |
| 2020/0367185 A1* | 11/2020 | Kim | .............. H04W 56/00 |

FOREIGN PATENT DOCUMENTS

| | | | | |
|---|---|---|---|---|
| EP | 3200528 A4 | * | 10/2017 | .............. H04L 1/08 |
| KR | 102467752 B1 | * | 1/2016 | .............. H04L 7/00 |
| WO | WO-2020014846 A1 | * | 1/2020 | .............. H04W 4/06 |

OTHER PUBLICATIONS

Huawei et al., "Sidelink synchronization mechanisms for NR V2X", R1-1810139, 3GPP TSG RAN WG1 Meeting #94bis, Chengdu, China, Oct. 8-12, 2018.
LG Electronics, "Discussion on NR sidelink synchronization", R1-1810282, 3GPP TSG RAN WG1 Meeting #94bis, Chengdu, China, Oct. 8-12, 2018.
VIVO, "NR sidelink synchronization mechanism", R1-1810390, 3GPP TSG RAN WG1 Meeting #94bis, Chengdu, China, Oct. 8-12, 2018.
Mediatek Inc., "On NR V2X synchronization mechanism", R1-1810454, 3GPP TSG RAN WG1 Meeting #94bis, Chengdu, China, Oct. 8-12, 2018.
CATT, "Discussion on synchronization mechanism for NR V2X Sidelink", R1-1810541, 3GPP TSG RAN WG1 Meeting #94bis, Chengdu, China, Oct. 8-12, 2018.
Lenovo et al., "Synchronization mechanism", R1-1810575, 3GPP TSG RAN WG1 Meeting #94bis, Chengdu, China, Oct. 8-12, 2018.
AT&T, "Sidelink based synchronization mechanism", R1-1810699, 3GPP TSG RAN WG1 Meeting #94bis, Chengdu, China, Oct. 8-12, 2018.
ZTE, "Discussion about synchronization mechanism", R1-1810723, 3GPP TSG RAN WG1 Meeting #94bis, Chengdu, China, Oct. 8-12, 2018.
Intel Corporation, "Sidelink Synchronization for NR V2X Communication", R1-1810774, 3GPP TSG RAN WG1 Meeting #94bis, Chengdu, China, Oct. 8-12, 2018.
NEC, "Synchronization mechanism for NR V2X", R1-1810808, 3GPP TSG RAN WG1 Meeting #94bis, Chengdu, China, Oct. 8-12, 2018.
Samsung, "Discussion on Synchronization Mechanism", R1-1810869, 3GPP TSG RAN WG1 meeting #94bis, Chengdu, China, Aug. 8-12, 2018.
Itri, "Considerations on Sidelink Synchronization Enhancement for NR V2X", R1-1810940, 3GPP TSG-RAN WG1 Meeting #94bis, Chengdu, China, Oct. 8-12, 2018.
OPPO, "Discussion of synchronization mechanism for NR-V2X", R1-1810986, 3GPP TSG RAN WG1 Meeting #94bis, Chengdu, China, Oct. 8-12, 2018.
Spreadtrum Communications, "Discussion on NR Sidelink Synchronization Mechanisms ", R1-1811008, 3GPP TSG RAN WG1 Meeting #94bis, Chengdu, China, Oct. 8-12, 2018.
Interdigital Inc., "On Sidelink Synchronization for NR V2X", R1-1811214, 3GPP TSG RAN WG1 Meeting #94bis, Chengdu, China, Oct. 8-12, 2018.
Qualcomm Incorporated, "Synchronization design for NR V2X", R1-1811262, 3GPP TSG RAN WG1 Meeting #94bis, Chengdu, China, Oct. 8-12, 2018.
NTT Docomo, Inc., "Sidelink synchronization mechanism", R1-1811334, 3GPP TSG RAN WG1 Meeting #94bis, Chengdu, China, Oct. 8-12, 2018.
Sequans, "Considerations on sidelink synchronization for NR V2X", R1-1811412, 3GPP TSG RAN WG1 Meeting #94bis, Chengdu, China, Oct. 8-12, 2018.
Xiaomi, "Synchronization mechanism for NR V2X", R1-1811421, 3GPP TSG RAN WG1 Meeting #94bis, Chengdu, China, Oct. 8-12, 2018.
ITL, "Discussion on NR V2X Synchronization mechanism", R1-1811425, 3GPP TSG-RAN WG1 Meeting #94bis, Chengdu, China, Oct. 8-12, 2018.
Nokia et al., "Discussion on NR V2X Sidelink Synchronization", R1-1811428, 3GPP TSG-RAN WG1 Meeting #94bis, Chengdu, China, Oct. 8-12, 2018.
ITL, "Considerations on sidelink synchronization signal design for NR V2X", R1-1811444, 3GPP TSG RAN WG1 Meeting #94-bis, Chengdu, China, Oct. 8 ~ 12, 2018.
Ericsson, "On Synchronization for NR Sidelink", R1-1811593, 3GPP TSG-RAN WG1 Meeting #94-Bis, Chengdu, China, Oct. 2018.
Convida Wireless, "Design Considerations for NR SL Synchronization", R1-1811623, 3GPP TSG-RAN WG1 Meeting #94bis, Chengdu, China, Oct. 8-12, 2018.
CATT, "Summary of Offline Discussion on NR V2X synchronization mechanism", R1-1811895, 3GPP TSG RAN1 Meeting #94bis, Chengdu, China, Oct. 8-12, 2018.
CATT, "Summary of Offline Discussion on NR V2X Synchronization", R1-1812068, 3GPP TSG RAN1 Meeting #94bis, Chengdu, China, Oct. 8-12, 2018.
Qualcomm Incorporated, "Work item proposal on LTE Device to Device Proximity Services", RP-140518, 3GPP TSG RAN Meeting #63, Fukuoka, Japan, Mar. 3-6, 2014.
Qualcomm Incorporated, "Work Item Proposal for Enhanced LTE Device to Device Proximity Services", RP-142311, 3GPP TSG RAN Meeting #66, Maui, USA, Dec. 8-11, 2014.
LG Electronics et al., "New WI proposal: Support for V2V services based on LTE sidelink", RP-152293, 3GPP TSG RAN Meeting #70, Sitges, Spain, Dec. 7-10, 2015.
Huawei et al., "New WID on 3GPP V2X Phase 2", RP-170798, 3GPP TSG RAN Meeting #75, Dubrovnik, Croatia, Mar. 6-9, 2017.
Vodafone, "New SID: Study on NR V2X", RP-181429, 3GPP TSG RAN Meeting #80, La Jolla, USA, Jun. 11-14, 2018.
3GPP, "Evolved Universal Terrestrial Radio Access(E-UTRA); Physical layer procedures (Release 15)", 3GPP TS 36.213 V15.3.0 (Sep. 2018), Oct. 1, 2018.

* cited by examiner

METHOD EXECUTED BY USER EQUIPMENT, AND USER EQUIPMENT

CROSS-REFERENCE TO RELATED APPLICATIONS

This application is a national stage application of International Patent Application No. PCT/CN2019/126311, filed Dec. 18, 2019, which claims the benefit of priority to CN patent application No. 201811579267.5, filed Dec. 21, 2018. Each of these applications is incorporated herein by reference in its entirety.

FIELD

The present disclosure relates to the technical field of wireless communication, and more particularly, to a method executed by a user equipment, a method executed by a base station, and a corresponding user equipment.

BACKGROUND

In conventional cellular networks, all communications must be performed through base stations. D2D (Device-to-Device) communication is different from the conventional cellular networks and refers to a communication method in which two user equipment can directly communicate with each other without forwarding information via a base station or a core network. At the 3rd Generation Partnership Project (3GPP) RAN #63 plenary meeting held in March 2014, a study topic on the implementation of a D2D proximity service communication by using an LTE apparatus was approved (see Non-Patent Literature (NPL) 1, listed below). The functions of the D2D communication introduced by LTE Release 12 include:
  1) Discovery function between proximate equipment under an LTE network coverage scenario;
  2) Direct broadcast communication (Broadcast) function between proximate equipment; and
  3) Unicast and groupcast communication functions supported by higher layers.

At the 3GPP RAN #66 plenary meeting held in December 2014, a study item on an enhanced LTE eD2D (enhanced D2D) communication was approved (see NPL 2). The main functions of the eD2D communication introduced by LTE Release 13 include:
  1) D2D discovery in an outside network coverage scenario and in a partial network coverage scenario; and
  2) Priority processing mechanism for D2D communication.

Based on the design of the D2D communication mechanism, the feasibility study topic of V2X based on D2D communication was approved at the 3GPP RAN #68 plenary meeting held in June 2015. V2X stands for Vehicle to Everything and is expected to realize information interaction between the vehicle and all entities that may affect the vehicle in order to reduce accidents, reduce traffic congestion, reduce environmental pollution and provide other information services. V2X includes four main aspects:
  1) V2V: Vehicle to Vehicle (e.g., vehicle-to-vehicle communication);
  2) V2P: Vehicle to Pedestrian (e.g., a vehicle sends alerts to pedestrians or non-motor vehicles);
  3) V2N: Vehicle to Network (e.g., a vehicle is connected to a network); and
  4) V2I: Vehicle to Infrastructure (e.g., a vehicle communicates with a road infrastructure).

3GPP divides the V2X study and standardization into three stages. The first stage was completed in September 2016 and mainly focuses on the V2V service based on D2D communication (also referred to as sidelink), i.e., proximity communication technology (see NPL 3), of LTE Release 12 and Release 13. The first stage (Stage 1) of the V2X introduces a new D2D communication interface called a PC5 interface. The PC5 interface is mainly used to solve the communication problem of a cellular vehicle network under a high-speed (up to 250 km/h) and high-node density environment. The vehicles can exchange information such as position, speed and direction through the PC5 interface, i.e. the vehicles can communicate directly to each other through the PC5 interface. Compared with the D2D proximity communication mechanism, the functions of the V2X introduced by LTE Release 14 include:
  1) A higher-density DMRS configured to support a high-speed scenario;
  2) A sub-channel introduced to enhance a method for allocating resources; and
  3) A user equipment sensing mechanism with semi-persistent scheduling.

The second stage of the V2X study topic belongs to the study scope of LTE Release 15 (see NPL 4), and the main features introduced include high-order 64 QAM modulation, V2X carrier aggregation, short TTI, and the feasibility study of transmission diversity.

At the 3GPP RAN #80 plenary meeting held on June 2018, the corresponding third stage of the V2X feasibility study topic based on 5G New Radio (NR) network technology (see NPL 5) was approved. The study plan of this topic includes the design of a sidelink synchronization mechanism. At the 3GPP RAN1 #94bis meeting held in October 2018, there are two conclusions (see NPL 6) as follows for the design of the NR V2X synchronization mechanism:
  1) For the NR sidelink UE, the eNB is supported as a synchronization source (i.e., sync source, for short) (e.g., the NR sidelink UE can select the eNB as the synchronization source under a standardized priority criterion); and
  2) For the NR sidelink, the eNB is supported to control a resource allocation mode (NR V2X mode 2) selected by the UE in the NR sidelink (e.g., the eNB broadcasts the semi-static configuration information of the NR V2X mode 2).

The solution of the present disclosure is mainly directed to a method for the NR sidelink UE to determine TDD uplink and downlink configuration information (also referred to as TDD configuration information) transmitted in sidelink broadcast information when the NR sidelink UE selects an eNB as a synchronization source or the eNB controls the NR sidelink UE.

The solution of the present disclosure also includes a method for configuring the periodicity of a TDD configuration pattern in the NR network technology.

PRIOR ART LITERATURE

Non-Patent Literature

NPL 1: RP-140518, Work Item Proposal on LTE Device to Device Proximity Services
NPL 2: RP-142311, Work Item Proposal for Enhanced LTE Device to Device Proximity Services
NPL 3: RP-152293, New WI Proposal: Support for V2V services based on LTE sidelink
NPL 4: RP-170798, New WID on 3GPP V2X Phase 2

NPL 5: RP-181480, New SID Proposal: Study on NR V2X

NPL 6: RAN1 #94bis, Chairman notes, Section 7.2.4.1.3

SUMMARY

In order to solve at least some of the above problems, the present disclosure provides a user equipment and a method executed by a user equipment, which may cause a user equipment to determine TDD configuration information transmitted in sidelink broadcast information, thereby improving communication efficiency. In addition, the present disclosure provides a method executed by a user equipment, and a user equipment, which can effectively configure the periodicity of a TDD configuration pattern in the NR network technology.

According to the present disclosure, a method executed by a user equipment is provided and comprises: receiving system information from a base station, wherein the system information includes time division duplexing (TDD) configuration information; and transmitting sidelink communication system information, wherein the sidelink communication system information includes sidelink TDD configuration information.

The above method may further comprise selecting a synchronization source on a frequency domain resource that performs a sidelink communication.

In the above method, the sidelink communication system information may further include indication information, and the indication information indicates the synchronization source selected by the user equipment.

In the above method, the indication information may be indicated by at least one of an indication field in the sidelink communication system information, physical sidelink broadcast channel (PSBCH) scrambling or generation of scrambling sequences, and demodulation reference signal (DMRS) sequences for PSBCH channel estimation.

In the above method, the synchronization source may be an evolved base station (eNB) or a new radio (NR) base station (gNB).

In the above method, when the indication information indicates that the synchronization source selected by the user equipment is an eNB, it may indicate that the sidelink TDD configuration information in the sidelink communication system information is interpreted according to Long Term Evolution (LTE) TDD configuration information.

In the above method, the sidelink communication system information may further include indication information, and the indication information is used for a user equipment that receives the sidelink communication system information to determine a priority for selecting the synchronization source.

In the above method, the sidelink TDD configuration information may include one or two configuration patterns, and the one or two configuration patterns include at least one of a configuration periodicity and a starting subframe number or a slot number corresponding to the configuration periodicity, or the number of subframes or slots of a sidelink resource.

According to the present disclosure, a method executed by a user equipment is also provided and comprises: receiving system information from a base station, wherein the system information includes time division duplexing (TDD) configuration information; and configuring a periodicity of a TDD configuration pattern according to the value of a configuration periodicity included in the TDD configuration information, wherein the value of the configuration periodicity includes 6 ms.

The present disclosure provides a user equipment comprising: a processor; and a memory configured to store instructions; wherein the instructions, when executed by the processor, may perform the above-mentioned method.

Disclosure Effect

According to the present disclosure, the user equipment and the method executed by the user equipment may make the user equipment determine TDD configuration information transmitted in sidelink broadcast information, thereby improving communication efficiency. In addition, the periodicity of a TDD configuration pattern in the NR network technology can be effectively configured.

BRIEF DESCRIPTION OF THE DRAWINGS

The above and other features of the present disclosure will become more apparent with the following detailed description in conjunction with the accompanying drawings.

DETAILED DESCRIPTION OF THE PREFERRED EMBODIMENTS

The present disclosure will be described in detail with reference to the accompanying drawings and specific implementations. It should be noted that the present disclosure should not be limited to the specific embodiments described below. In addition, for the sake of simplicity, detailed descriptions of well-known technologies that are not directly related to the present disclosure are omitted in order to prevent confusion in understanding the present disclosure.

A plurality of embodiments according to the present disclosure are specifically described below by adopting a 5G mobile communication system and its subsequent evolved versions as exemplary application environments. However, it should be noted that the present disclosure is not limited to the following embodiments, but may be applied to more other wireless communication systems, such as a communication system subsequent to 5G systems and a 4G mobile communication system preceding 5G systems.

Some terms involved in the present disclosure are described below. Unless otherwise specified, the terms used in the present disclosure adopt the definitions herein. The terms given in the present disclosure may be named differently in LTE, LTE-Advanced, LTE-Advanced Pro, NR, and later communication systems, but unified terms are adopted in the present disclosure. When applied to a specific system, the terms may be replaced with terms adopted in the corresponding system.

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB
gNB: NR base station
TTI: Transmission Time Interval
OFDM: Orthogonal Frequency Division Multiplexing
C-RNTI: Cell Radio Network Temporary Identifier
CSI: Channel State Indicator
HARQ: Hybrid Automatic Repeat Request
CSI-RS: Channel State information-Reference Signal
CRS: Cell Reference Signal
PUCCH: Physical Uplink Control Channel
PUSCH: Physical Uplink Shared Channel
UL-SCH: Uplink Shared Channel
Sidelink: Sidelink
SCI: Sidelink Control Information
PSCCH: Physical Sidelink Control Channel
MCS: Modulation and Coding Scheme
PRB: Physical Resource Block
PSSCH: Physical Sidelink Shared Channel
FDM: Frequency Division Multiplexing
RRC: Radio Resource Control RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB1: System Information Block Type 1
SLSS: Sidelink synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: BandWidth Part
GNSS: Global Navigation Satellite System The following is a description of related art associated with the solution of the present disclosure. Unless otherwise specified, the same terms in the specific embodiments have the same meaning as in the relate art.

It is worth noting that V2X has the same meaning as sidelink in the description of the present disclosure. V2X may also represent sidelink in this disclosure. Similarly, sidelink may also represent V2X in this disclosure, and no specific distinction and limitation will be made hereinafter.

The TDD configuration information and the sidelink TDD configuration information in the embodiment of the present disclosure may include at least one TDD configuration pattern. The TDD configuration pattern may include corresponding configuration information, such as configuration periodicity, reference subcarrier spacing, etc.

The LTE TDD uplink and downlink configuration information in the embodiments of the present disclosure and the TDD configuration information in the embodiments of the present disclosure may be equivalently substituted (e.g., they may have the same or similar meaning).

LTE TDD Uplink and Downlink Configuration Information

LTE supports a total of seven types of TDD uplink and downlink configuration information (also referred to as TDD configuration information), numbered as TDD UL/DL configurations 0 to 6, as shown in Table 4.2-2 below. Herein, "D" represents a downlink subframe, "U" represents an uplink subframe, and "S" represents a special subframe. The special subframe consists of a downlink symbol (DwPTS), a guard gap, and an uplink symbol (UpPTS). The present disclosure is not related to the specific configuration of the special subframe and will not be described in detail herein. The LTE base station eNB configures TDD uplink and downlink configuration information of the present cell in the SystemInformationBlockType1 (SIB1).

TABLE 4.2-2

| | uplink-downlink configurations | | | | | | | | | | |
|---|---|---|---|---|---|---|---|---|---|---|---|
| Uplink-downlink configuration | Downlink-to-Uplink Switch-point periodicity | \multicolumn{10}{c}{Subframe number} |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Method for Indicating and Determining NR TDD Configuration Information

The NR base station gNB configures cell-specific TDD configuration information via TDD-UL-DL-ConfigCommon in SIB1, and the information may include:

reference subcarrier spacing $\mu_{ref}$;

high-level parameter pattern1 (this information element is mandatory and represents TDD configuration pattern1 as the same below), which includes the following high-level parameters:

configuration periodicity P(ms);

number of downlink slots $d_{slots}$, wherein only the downlink OFDM symbol is included in the downlink slot (which can be referred to as DL-only slot);

number of downlink OFDM symbols $d_{sym}$;

number of uplink slots $u_{slots}$, wherein only the uplink OFDM symbol is included in the uplink slot (which can be referred to as UL-only slot);

number of uplink OFDM symbols $u_{sym}$.

Figure 1:
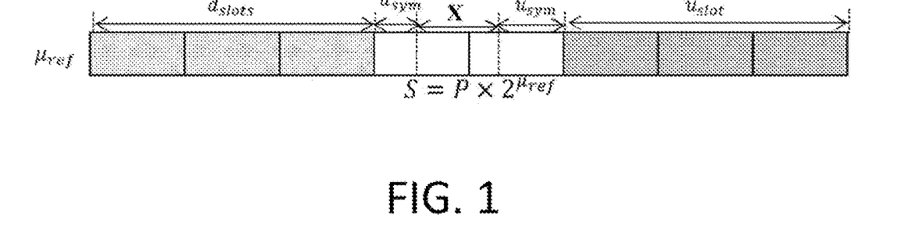
FIG. 1 is a diagram schematically illustrating Rel-15NR TDD configuration information TDD-UL-DL-ConfigCommon in the existing 3GPP standard specification.

The periodicity of the configuration information is P(ms) and corresponds to consecutive S=P×2^μref slots. FIG. 1 shows the specific meaning of each high-level parameter included in pattern1. Among the S slots, the $d_{slots}$ downlink slots are located at the beginning, and the $u_{slots}$ uplink slots are located at the end of the S slots. The $d_{sym}$ downlink OFDM symbols are located after the downlink slots, the $u_{sym}$ uplink OFDM symbols are located before the uplink slots, and the remaining $(S-d_{slots}-u_{slots}) \cdot N_{symbol}^{slot} - d_{sym} - u_{sym}$ OFDM symbols are X symbols (X represents a flexible symbol). In different application scenarios, each X symbol may be a downlink symbol, an uplink symbol, or a guard gap symbol between the downlink and the uplink. Herein, for a normal cyclic prefix (CP), $N_{symbol}^{slot}=14$; and for an extended CP, $N_{symbol}^{slot}=12$, where $N_{symbol}^{slot}$ is the number of symbols in a slot.

The TDD-UL-DL-ConfigCommon in SIB1 may include a high-level parameter pattern2 (this information element is optional and indicates TDD configuration pattern2 as the same below). The configuration information forms of pattern2 and pattern1 are the same (for example, the parameters of pattern2 include: periodicity P2, $d_{slots, 2}$, $u_{slots, 2}$, $d_{sym, 2}$, $u_{sym, 2}$), and the meanings of the corresponding parameters of pattern2 are the same as those of the corresponding parameters of pattern1. The reference subcarrier spacing $\mu_{ref}$ of pattern2 is the same as that of pattern1, so the reference subcarrier spacing $\mu_{ref}$ will not be configured repeatedly for pattern2. The periodicity of the configuration information is P2(ms) and corresponds to $S2=P \times 2^{\mu_{ref}}$ consecutive slots. Among the S2 slots, the $d_{slots, 2}$ downlink slots are located at the beginning, and the $u_{slots, 2}$ uplink slots are located at the end of the S2 slots. The $d_{sym, 2}$ downlink OFDM symbols are located after the downlink slots, the $u_{sym, 2}$ uplink OFDM symbols are located before the uplink slots, and the remaining $(S2-d_{slots,2}-u_{slots,2}) \cdot N_{symbol}^{slot} - d_{sym,2} - u_{sym,2}$ OFDM symbols are X symbols (X represents a flexible symbol). In different application scenarios, each X symbol may be a downlink symbol, an uplink symbol, or a guard gap symbol between the downlink and the uplink. Herein, for a normal CP, $N_{symbol}^{slot}=14$; and for an extended CP, $N_{symbol}^{slot}=12$.

When TDD-UL-DL-ConfigCommon includes both pattern1 and pattern2, the configuration periodicity of the TDD configuration information is (P+P2)ms, and includes the above S and S2 slots (that is, the S slots are located first, and the S2 slots are located later in the time domain).

The periodicities P and P2 in the above configuration information may satisfy the following conditions:
1) P is a divisor of 20 (e.g., 20 can be divided by P, and the first time domain symbol of every 20/P periodicities is the first symbol of an even frame);
2) P+P2 is a divisor of 20 (e.g., 20 can be divided by P+P2, and the first time domain symbol of every 20/(P+P2) periodicities is the first symbol of an even frame).

The range of values that can be taken by P and P2 may include {0.5, 0.625, 1, 1.25, 2, 2.5, 5, 10} ms. The values of P and P2 may also include 3 ms and 4 ms and are represented by IE: dl-UL-TransmissionPeriodicity-v1530. When the base station configures dl-UL-TransmissionPeriodicity-v1530 in pattern1/2, the UE may ignore the dl-UL-TransmissionPeriodicity corresponding to pattern 1/2.

Sidelink Communication Scenarios
1) Out-of-Coverage: Both UEs performing a sidelink communication are out of network coverages (for example, the UE cannot detect any cell that meets the "cell selection criteria" on the frequency where the sidelink communication is required).
2) In-Coverage: Both UEs performing a sidelink communication are in network coverages (for example, the UE can at least detect a cell that meets the "cell selection criteria" on the frequency where the sidelink communication is required).
3) Partial-coverage: one of the UEs performing a sidelink communication is out of a network coverage, and the other UE is in a network coverage.

From the UE side, the UE only has two scenarios, that is, the UE is out of a network coverage or the UE is in a network coverage. The partial network coverage is described from the connection of the UEs on both sides of the sidelink communication.

Rel-14/15 LTE V2X SLSS/PSBCH and V2X MIB

The LTE sidelink may use LTE uplink resources, and the design of its physical layer channel architecture is similar to that of the LTE uplink.

The LTE sidelink defines a sidelink synchronization signal (SLSS) used for frequency and time synchronization between two UEs performing a sidelink communication. In particular, when at least one of the two UEs is out of network coverage, one UE acquires the SLSS transmitted by the other UE. The SLSS includes a primary synchronization signal (PSSS) and a secondary synchronization signal (SSSS), and the PSSS and the SSSS may carry an SLSS ID, the principle of which is the same as the principle that PCI is carried by the primary synchronization signal (LTE/NR PSS) and the secondary synchronization signal (LTE/NR SSS) in LTE and NR cellular communications.

The LTE sidelink also defines a PSBCH for broadcasting system information related to the sidelink, wherein:
1) the time-frequency resources used by the PSBCH occupy 72 subcarriers in the centers of the sidelink carriers in the frequency domain and occupy one subframe used for the PSBCH in the time domain, but exclude the resource elements (REs) used for a DMRS reference signal and the SLSS synchronization signal described above; and
2) the system information related to the sidelink transmitted on the PSBCH may be MIB-SL-V2X (Master-InformationBlock-SL-V2X, i.e., a master information block used for V2X), which includes the following:
A transmission bandwidth configuration indicated by using the parameter sl-Bandwidth.
TDD configuration information indicated by using the parameter tdd-ConfigSL. There are 8 cases for tdd-ConfigSL, wherein none indicates that the sidelink carrier transmitting the MIB is FDD, 0 indicates TDD UL/DL Configuration 0, 1 indicates TDD UL/DL Configuration 1, and so on.
A DFN (direct frame number) indicated by using the parameter directFrameNumber and used for transmitting the SLSS and the PSBCH.
A DSFN (direct subframe number) indicated by using the parameter directSubframeNumber and used for transmitting the SLSS and the PSBCH.
A network in-coverage flag that is indicated by using the parameter inCoverage and indicates whether the UE transmitting the MIB-SL-V2X is in an LTE network coverage.

Rel-14/15 LTE V2X UE Transmits V2X MIB

When a V2X UE has data to transmit, the UE may transmit a V2X MIB. The method and the procedure for the V2X UE to determine each domain in the V2X MIB are as follows (where the leading number for each operation described below indicates a relative algorithmic logic level of that operation within the procedure):

1> In the frequency domain resource performing a sidelink communication, if the V2X UE is a UE in a network coverage, then:
2> the above UE configures the inCoverage to TRUE;
2> the above UE receives SIB2 broadcasted by the selected cell on the frequency domain resource, wherein the SIB2 includes ul-Bandwidth, and the UE determines sl-Bandwidth according to the value of the ul-Bandwidth;
2> if the message SIB1 broadcasted by the cell includes tdd-Config, then:
3> the UE configures the subframeAssignmentSL as a corresponding domain in tdd-Config (subframeAssignment in tdd-Config) included in the SIB1 broadcasted by the selected cell;
2> otherwise:
3> the UE configures the subframeAssignmentSL as none;
1> otherwise, if there is no cell coverage on the frequency domain resource performing the sidelink communication, and the v2x-InterFreqInfoList in the RRCConnectionReconfiguration or System Information Block Type 21 (SIB21) of the serving cell or the primary cell includes the above frequency domain resource, then:
2> the above UE configures the inCoverage to TRUE;
2> the UE configures the sl-Bandwidth as the value of a corresponding domain in the v2x-InterFreqInfoList;
2> the above UE configures the subframeAssignmentSL as the value of a corresponding domain in pre-configuration information (e.g., v2x-CommPreconfigGeneral);
1> otherwise, if there is no cell coverage on the frequency domain resource performing the sidelink communication, and the UE selects GNSS as the synchronization source, and the syncOffsetIndicator3 is not included in the SL-V2X-Preconfiguration, then:
2> the above UE configures the inCoverage to TRUE;
2> the above UE configures the sl-Bandwidth and the subframeAssignmentSL as the value of a corresponding domain in pre-configuration information (e.g., v2x-CommPreconfigGeneral);
1> otherwise, if the UE selects a synchronization source UE, then:
2> the above UE configures the inCoverage to FALSE;
2> the above UE configures the sl-Bandwidth and the subframeAssignmentSL as the value of a corresponding domain of the MasterInformationBlock-SL-V2X;
2> otherwise:
2> the above UE configures the inCoverage to FALSE;
2> the above UE configures the sl-Bandwidth and the subframeAssignmentSL as the value of a corresponding domain in pre-configuration information (e.g., v2x-CommPreconfigGeneral);
1> the above UE determines the values of the directFrameNumber and the directSubframeNumber according to the subframe transmitting the SLSS.

Rel-14/15 LTE V2X UE Selects a Synchronization Source

In LTE V2X, similar to a cellular network communication mechanism, if the UE has data to transmit, then the UE may synchronize the time domain and the frequency domain first. In a cellular network communication, when a UE receives a primary synchronization signal and a secondary synchronization signal, the timing relationship with a cell can be determined. Specifically, taking time domain synchronization as an example, in LTE, the UE determines frame synchronization and subframe synchronization according to the received PSS and SSS; and in NR, the UE determines frame synchronization and subframe/slot synchronization according to the number of synchronization system information blocks (SSBs) and a predefined mapping method. For V2X or sidelink communication, the UE determines the timing relationship of the sidelink or V2X transmission or reception according to the timing of the selected synchronization source. For LTE V2x, the UE may select a synchronization source. The synchronization source may include:

1) eNB;
2) GNSS; and/or
3) LTE sidelink UE.

The UE determines a synchronization source according to a certain predefined priority criterion. The priority criterion includes, but is not limited to: the priority of the base station eNB is higher than that of the sidelink UE, and the priority of a sidelink UE transmitting a signal with higher RSRP is higher than that of another UE. That is, when other conditions are the same, the UE preferentially selects a base station eNB rather than a sidelink UE as the synchronization source. In the embodiment of the present disclosure, if the UE is involved in selecting a synchronization source, the UE will determine the synchronization source according to a certain priority criterion by default.

Figure 2:
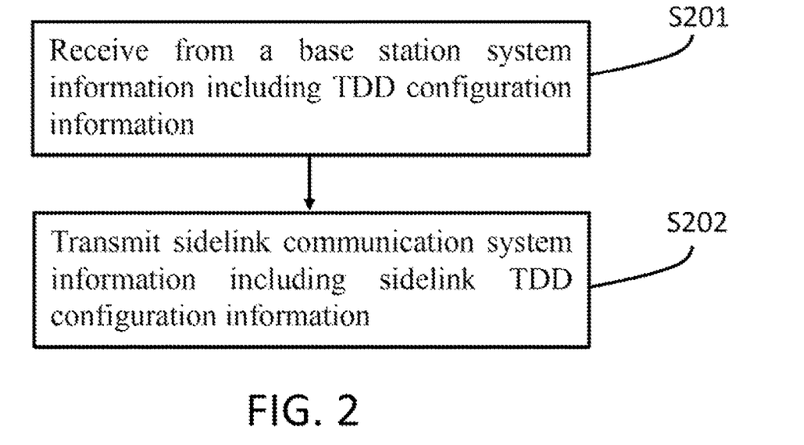
FIG. 2 is a flowchart schematically illustrating a method executed by a user equipment according to an embodiment of the present disclosure.

FIG. 2 is a flowchart schematically illustrating a method executed by a user equipment according to an embodiment of the present disclosure, wherein the method executed by the user equipment (UE) comprises step S201 and step S202. In step S201, the UE receives system information from a base station, and the system information includes TDD configuration information. In step S202, the UE transmits sidelink communication system information, and the sidelink communication system information includes sidelink TDD configuration information. According to the method, the user equipment can determine TDD configuration information transmitted in sidelink broadcast information, thereby improving communication efficiency.

Figure 3:
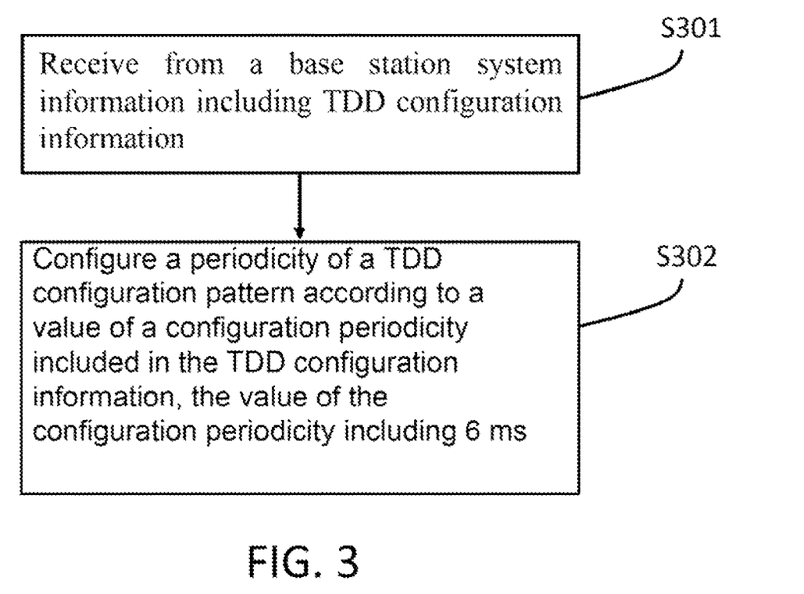
FIG. 3 is another flowchart schematically illustrating a method executed by a user equipment according to an embodiment of the present disclosure.

FIG. 3 is another flowchart schematically illustrating a method executed by a user equipment according to an embodiment of the present disclosure, wherein the method executed by the user equipment (UE) comprises step S301 and step S302. In step S301, the UE receives system information from a base station, and the system information includes TDD configuration information. In step S302, the UE configures the periodicity of a TDD configuration pattern according to the value of a configuration periodicity included in the TDD configuration information, and the value of the configuration periodicity includes 6 ms. According to the method, the periodicity of a TDD configuration pattern can be effectively configured in the NR network technology.

Hereinafter, several embodiments of the present disclosure are described in detail.

Figure 4:
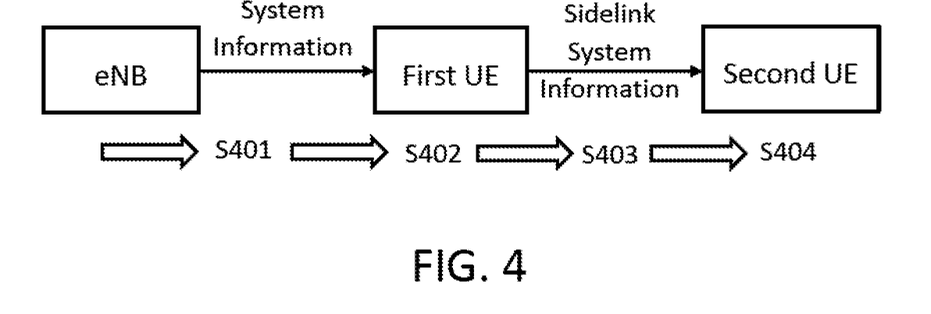
FIG. 4 is a basic procedure diagram schematically illustrating a method executed by a user equipment according to some embodiments of the present disclosure.

FIG. 4 is a basic procedure diagram illustrating a method executed by a user equipment according to some embodiments of the present disclosure.

As shown in FIG. 4, the user equipment may perform the following steps:

In step S401, the first user equipment receives system information transmitted by an eNB, wherein the system information at least includes TDD uplink and downlink configuration information and/or sidelink configuration information of a frequency domain resource performing a sidelink communication.

In step S402, the first user equipment selects the eNB as a synchronization source on the frequency domain resource performing the sidelink communication.

In step S403, the first user equipment transmits sidelink communication system information to a second user equipment. The sidelink communication system information may include indication information and TDD configuration information. The indication information indicates that the synchronization source of the first user equipment is an eNB or that the synchronization source of the first user equipment is a gNB. In some implementations, the functionality of the indication information may include but is not limited to the following examples:

1) Indication field in a sidelink communication system information block: if the indication field is a one-bit indication, setting the indication field as 1 indicates that the synchronization source of the first user equipment is a gNB, and setting the indication field as 0 indicates that the synchronization source of the first user equipment is an eNB; and the reverse is also possible. The indication field may also be indicated by a plurality of bits, and the present disclosure is not limited thereto.

2) PSBCH scrambling or generation of scrambling sequences: when the synchronization source of the first user equipment is a gNB or an eNB, the PSBCH scrambling sequences or scrambling methods are different;

3) DMRS sequences for PSBCH channel estimation: two or more DMRS sequences are predefined to respectively indicate that the synchronization source of the first user equipment is a gNB or an eNB.

In step S404, the second user equipment determines interpretation means of the TDD uplink and downlink configuration information according to the indication information, or the second user equipment determines a priority for selecting the synchronization source according to the indication information. In some embodiments, if the indication information indicates that the synchronization source of the first user equipment is an eNB, the second user equipment interprets the TDD configuration information in the sidelink communication system information block according to LTE TDD uplink and downlink configuration information (LTE UL/DL configurations 0 to 6). In other embodiments, the second user equipment determines a priority for selecting the synchronization source. If the indication information indicates that the synchronization source is a gNB or an eNB, the second user equipment assumes that the priority of the first user equipment selecting the gNB as the synchronization source is higher than, equal to, or lower than the priority of the first user equipment selecting the eNB as the synchronization source. More specifically, the second user equipment preferentially selects the first user equipment whose indication information is a gNB as the synchronization source UE (if other conditions for determining the priority are the same or different), or the second user equipment assumes that the priorities of the first user equipment whose indication information are a gNB and an eNB as the synchronization source UEs are the same (if other conditions for determining the priority are the same or different), or the second user equipment preferentially selects the first user equipment whose indication information is an eNB as the synchronization source UE (if other conditions for determining the priority are the same or different).

Optionally, in step S401 of some embodiments of the present disclosure, in another implementation, the first user equipment receives system information transmitted by an eNB, wherein the system information includes sidelink configuration information of a frequency domain resource performing a sidelink communication. The sidelink configuration information includes TDD configuration information of an NR sidelink communication, and the TDD configuration information includes one or two TDD configuration patterns.

Optionally, in yet another implementation of some embodiments of the present disclosure, the user equipment receives system information transmitted by a base station. The base station is an eNB or a gNB. The user equipment selects a synchronization source on a frequency domain resource of a sidelink communication. When the user equipment selects a synchronization source, it is assumed that the priority of the gNB is higher than, equal to or lower than the priority of the eNB. Specifically, the user equipment preferentially selects the gNB base station as the synchronization source (if other conditions for determining the priority are the same or different), or the user equipment assumes that the priorities of the gNB and the eNB are the same (if other conditions for determining the priority are the same or different), or the user equipment preferentially selects the eNB as the synchronization source (if other conditions for determining the priority are the same or different).

Figure 5:
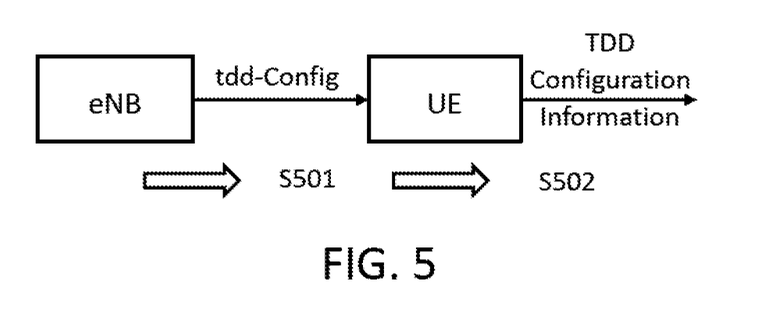
FIG. 5 is a basic procedure diagram schematically illustrating a method executed by a user equipment according to some embodiments of the present disclosure.

FIG. 5 is a basic procedure diagram illustrating a method executed by a user equipment according to some embodiments of the present disclosure.

As shown in FIG. 5, the user equipment may perform the following steps:

In step S501, the user equipment receives system information transmitted by an eNB, and the system information includes LTE TDD uplink and downlink configuration information. The user equipment selects the eNB as a synchronization source.

In step S502, the user equipment transmits sidelink communication system information, and the sidelink communication system information includes sidelink TDD configuration information. In some implementations, the functionality of the sidelink TDD configuration information may include but is not limited to the following examples:

1) if the LTE TDD uplink and downlink configuration information is TDD UL/DL configuration0, the sidelink TDD configuration information includes a configuration pattern (specified by a higher-layer parameter pattern1 as the same below), the configuration periodicity of the configuration pattern is 5 ms, the number of uplink slots (i.e., the number of slots of a sidelink resource) of the configuration pattern is 3, and the starting subframe number corresponding to the configuration periodicity is subframe #0 or subframe #5; alternatively, the sidelink TDD configuration information includes a first configuration pattern and a second configuration pattern (specified by higher-layer parameters pattern1 and pattern2, respectively, as the same below), the configuration periodicities of the first configuration pattern and the second configuration pattern are both 5 ms, the numbers of uplink slots (i.e., the numbers of slots of sidelink resources) of the two configuration patterns are both 3, and the starting subframe numbers corresponding to the configuration periodicities are subframe #0 and subframe #5, respectively;

2) if the LTE TDD uplink and downlink configuration information is TDD UL/DL configuration1, the sidelink TDD configuration information includes a configuration pattern, the configuration periodicity of the configuration pattern is 5 ms, the number of uplink slots (i.e., the number of slots of a sidelink resource) of the configuration pattern is 2, and the starting subframe number corresponding to the configuration periodicity is subframe #4 or subframe #9; alternatively, the sidelink TDD configuration information includes a first configuration pattern and a second configuration pattern, the configuration periodicities of the first configuration pattern and the second configuration pattern are both 5 ms, the numbers of uplink slots (i.e., the numbers of slots of sidelink resources) of the two configuration patterns are both 2, and the starting subframe numbers corresponding to the configuration periodicities are subframe #4 and subframe #9, respectively;

3) if the LTE TDD uplink and downlink configuration information is TDD UL/DL configuration2, the sidelink TDD configuration information includes a configuration pattern, the configuration periodicity of the configuration pattern is 5 ms, the number of uplink slots (i.e., the number of slots of a sidelink resource) of the configuration pattern is 1, and the starting subframe number corresponding to the configuration periodicity is subframe #3 or subframe #8; alternatively, the sidelink TDD configuration information includes a first configuration pattern and a second configuration pattern, the configuration periodicities of the first configuration pattern and the second configuration pattern are both 5 ms, the numbers of uplink slots (i.e., the numbers of slots of sidelink resources) of the two configuration patterns are both 1, and the starting subframe numbers corresponding to the configuration periodicities are subframe #3 and subframe #8, respectively;

4) if the LTE TDD uplink and downlink configuration information is TDD UL/DL configuration3, the sidelink TDD configuration information includes a configuration pattern, the configuration periodicity of the configuration pattern is 10 ms, the number of uplink slots (i.e., the number of slots of a sidelink resource) of the configuration pattern is 3, and the starting subframe number corresponding to the configuration periodicity is subframe #5; alternatively, the sidelink TDD configuration information includes a first configuration pattern and a second configuration pattern, the configuration periodicities of the first configuration pattern and the second configuration pattern are both 5 ms, the number of uplink slots (i.e., the number of slots of a sidelink resource) of the first configuration pattern is 3 and the starting subframe number corresponding to the configuration periodicity of the first configuration pattern is subframe #0, and the number of uplink slots (i.e., the number of slots of a sidelink resource) of the second configuration pattern is 0 and the starting subframe number corresponding to the configuration periodicity of the second configuration pattern is subframe #5;

5) if the LTE TDD uplink and downlink configuration information is TDD UL/DL configuration4, the sidelink TDD configuration information includes a configuration pattern, the configuration periodicity of the configuration pattern is 10 ms, the number of uplink slots (i.e., the number of slots of a sidelink resource) of the configuration pattern is 2, and the starting subframe number corresponding to the configuration periodicity is subframe #4; alternatively, the sidelink TDD configuration information includes a first configuration pattern and a second configuration pattern, the configuration periodicity of the first configuration pattern is 4 ms, the number of uplink slots (i.e., the number of slots of a sidelink resource) of the first configuration pattern is 2 and the starting subframe number corresponding to the configuration periodicity of the first configuration pattern is subframe #0, the configuration periodicity of the second configuration pattern is 6 ms, the number of uplink slots (i.e., the number of slots of a sidelink resource) of the second configuration pattern is 0 and the starting subframe number corresponding to the configuration periodicity of the second configuration pattern is subframe #4; alternatively, the sidelink TDD configuration information includes a first configuration pattern and a second configuration pattern, the configuration periodicity of the first configuration pattern is 5 ms, the number of uplink slots (i.e., the number of slots of a sidelink resource) of the first configuration pattern is 2 and the starting subframe number corresponding to the configuration periodicity of the first configuration pattern is subframe #9, the configuration periodicity of the second configuration pattern is 5 ms, the number of uplink slots (i.e., the number of slots of a sidelink resource) of the second configuration pattern is 0 and the starting subframe number corresponding to the configuration periodicity of the second configuration pattern is subframe #4;

6) if the LTE TDD uplink and downlink configuration information is TDD UL/DL configuration5, the sidelink TDD configuration information includes a configuration pattern, the configuration periodicity of the configuration pattern is 10 ms, the number of uplink slots (i.e., the number of slots of a sidelink resource) of the configuration pattern is 1, and the starting subframe number corresponding to the configuration periodicity is subframe #3; alternatively, the sidelink TDD configuration information includes a first configuration pattern and a second configuration pattern, the configuration periodicity of the first configuration pattern is 3 ms, the number of uplink slots (i.e., the number of slots of a sidelink resource) of the first configuration pattern is 1 and the starting subframe number corresponding to the configuration periodicity of the first configuration pattern is subframe #0, the configuration periodicity of the second configuration pattern is 7 ms, the number of uplink slots (i.e., the number of slots of a sidelink resource) of the second configuration pattern is 0 and the starting subframe number corresponding to the configuration periodicity of the second configuration pattern is subframe #3; alternatively, the sidelink TDD configuration information includes a first configuration pattern and a second configuration pattern, the configuration periodicity of the first configuration pattern is 5 ms, the number of uplink slots (i.e., the number of slots of a sidelink resource) of the first configuration pattern is 1 and the starting subframe number corresponding to the configuration periodicity of the first configuration pattern is subframe #8, the configuration periodicity of the second configuration pattern is 5 ms, the number of uplink slots (i.e., the number of slots of a sidelink resource) of the second configuration pattern is 0 and the starting subframe number corresponding to the configuration periodicity of the second configuration pattern is subframe #3; and 7) if the LTE TDD uplink and downlink configuration information is TDD UL/DL configuration6, the sidelink TDD configuration information includes a first configuration pattern and a second configuration pattern, the configuration periodicity of the first configuration pattern is 6 ms, the number of uplink slots (i.e., the number of slots of a sidelink resource) of the first configuration pattern is 3 and the starting subframe number corresponding to the configuration periodicity of the first configuration pattern is subframe #9, the configuration periodicity of the second configuration pattern is 4 ms, the number of uplink slots (i.e., the number of slots of a sidelink resource) of the second configuration pattern is 2 and the starting subframe number corresponding to the configuration periodicity of the second configuration pattern is subframe #5; alternatively, the sidelink TDD configuration information includes a configuration pattern, the configuration periodicity of the configuration pattern is 5 ms, the number of uplink slots (i.e., the number of slots of a sidelink resource) of the configuration pattern is 3, and the starting subframe number corresponding to the configuration periodicity is subframe #0 or subframe #5; alternatively, the sidelink TDD configuration information includes a first configuration pattern and a second configuration pattern, the configuration periodicities of the first configuration pattern and the second configuration pattern are both 5 ms, the numbers of uplink slots (i.e., the numbers of slots of sidelink resources) of the two configuration patterns are both 3, and the starting subframe numbers corresponding to the configuration periodicities are subframe #0 and subframe #5, respectively.

Figure 6:
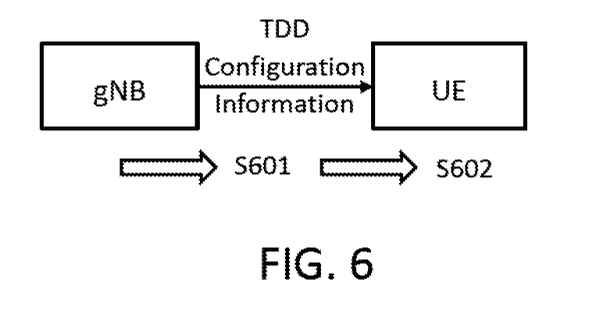
FIG. 6 is a basic procedure diagram schematically illustrating some embodiments of the present disclosure.

FIG. 6 is a basic procedure diagram illustrating some embodiments of the present disclosure.

As shown in FIG. 6, the method may include the following steps:

In step S601, the user equipment receives configuration information transmitted by a base station. The configuration information includes TDD configuration information of a cell.

In step S602, the TDD configuration information includes one or two configuration patterns. The one or two configuration patterns include a configuration periodicity. The value of the configuration periodicity is 6 ms and/or 7 ms;

Alternatively, in step S602 of the present embodiments, optionally, the TDD configuration information includes two configuration patterns. The two configuration patterns include a configuration periodicity. The configuration periodicity of the first configuration pattern is 3 ms, and the configuration periodicity of the second configuration pattern is 7 ms; alternatively, the configuration periodicity of the first configuration pattern is 4 ms, and the configuration periodicity of the second configuration pattern is 6 ms;

Alternatively, in step S602 of the present embodiments, optionally, if the TDD configuration information includes a configuration pattern, the user equipment assumes that 20 can be divided by the configuration periodicity of the configuration pattern; alternatively, the user equipment assumes that the configuration periodicity of the configuration pattern is not 3 ms, or 4 ms, or 6 ms, or 7 ms.

Figure 7:
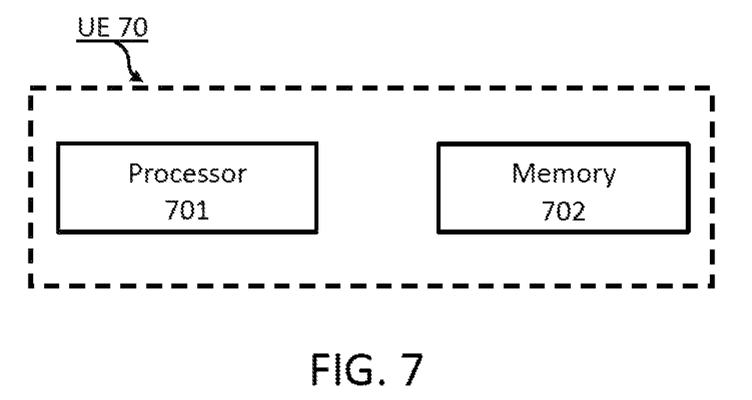
FIG. 7 is a block diagram schematically illustrating a user equipment according to the present disclosure.

FIG. 7 is a block diagram showing a user equipment UE according to the present disclosure. As shown in FIG. 7, the user equipment UE 70 includes a processor 701 and a memory 702. The processor 701 may include, for example, a microprocessor, a microcontroller, an embedded processor, or the like. The memory 702 may include, for example, a volatile memory (e.g., random access memory (RAM)), a hard disk drive (HDD), a non-volatile memory (e.g., flash memory), or other memory. The memory 702 has program instructions stored thereon. The instructions, when executed by the processor 701, may perform the methods executed by the user equipment, which have been described above in detail according to the present disclosure.

The method and related equipment of the present disclosure have been described above in conjunction with preferred embodiments. Those skilled in the art can understand that the methods shown above are only exemplary, and the various embodiments described above can be combined with one another without any contradiction. The method of the present disclosure is not limited to the steps and their sequences shown above. The network nodes and user equipment shown above may comprise more modules, e.g., modules that can be developed or will be developed in the future for base stations, MMES, or UEs, etc. Various identities shown above are only exemplary rather than restrictive, and the present disclosure is not limited to the information elements served as examples of these identities. Those skilled in the art can make many changes and modifications based on the teaching of the illustrated embodiments.

It should be understood that the above embodiments of the present disclosure may be implemented through software, hardware, or a combination of software and hardware. For example, various components in the base station and the user equipment in the above embodiments may be implemented through various devices, including but not limited to an analog circuit device, a digital circuit device, a digital signal processing (DSP) circuit, a programmable processor, an application-specific integrated circuit (ASIC), a field-programmable gate array (FPGA), a programmable logic device (e.g., a complex programmable logic device (CPLD)), and the like.

In the present application, the "base station" refers to a mobile communication data and control switching center with large transmission power and wide coverage area and includes resource allocation scheduling functionality, data receiving and transmitting functionality, and the like. The "user equipment" refers to a user mobile terminal such as a terminal device, e.g., a mobile phone, a notebook, or the like, which can perform wireless communication with a base station or a micro base station.

In addition, the embodiments of the present disclosure presented here may be implemented on a computer program product. More specifically, the computer program product may be described as below. The computer program product has a computer-readable medium on which computer program logic is encoded. The computer program logic provides relevant operations to implement the above-described technical solution of the present disclosure when the computer program logic is executed on a computing apparatus. The computer program logic enables a processor to execute the operations (methods) described in the embodiments of the present disclosure when the computer program logic is executed on at least one processor of a computing system. Such an arrangement of the present disclosure is typically provided as software, a code, and/or other data structures that are configured or encoded on a computer-readable medium, such as an optical medium (e.g., a CD-ROM), a floppy disk or a hard disk, or, for example, firmware or microcodes on one or more other media like ROM or RAM or PROM chips, or downloadable software images, shared database, and the like in one or more modules. Software, firmware, or such configuration may be installed on a computing apparatus such that one or more processors in the computing apparatus perform the technical solutions described in the embodiments of the present disclosure.

Further, each functional module or each feature of the base station apparatus and the terminal apparatus used in each of the above embodiments may be realized or performed by a circuit, which is typically one or more integrated circuits. Circuits designed to execute each function described in this description may include general-purpose processors, digital signal processors (DSPs), application-specific integrated circuits (ASICs) or general-purpose integrated circuits, field-programmable gate arrays (FPGAs) or other programmable logic devices, discrete gates or transistor logic, or discrete hardware components, or any combination of the above. The general-purpose processor may be a microprocessor, or the processor may be a conventional processor, a controller, a microcontroller, or a state machine. The general-purpose processor or each circuit described above may be configured by a digital circuit, or may be configured by a logic circuit. Furthermore, with the advance in semiconductor technology, an advanced technology may appear to replace the existing circuit integration technology, and an integrated circuit obtained based on such an advanced technology may also be used by the present disclosure.

Although the present disclosure has been described in conjunction with the preferred embodiments of the present disclosure, it will be understood by those skilled in the art that various modifications, substitutions and changes may be made therein without departing from the spirit and scope of the present disclosure. Therefore, the present disclosure should not be limited by the above-described embodiments, but should be limited by the appended claims and their equivalents.

What is claimed is:

1. A method performed by a user equipment, the method comprising:
receiving system information from a base station, the system information including time division duplexing (TDD) configuration information;
selecting a synchronization source from a plurality of sources, including the base station and another user equipment, based on a priority criterion, wherein a priority of the base station is higher than a priority of the other user equipment;
transmitting sidelink communication system information, including sidelink TDD configuration information, based on the synchronization source; and
performing a sidelink communication based on the synchronization source, wherein:
the sidelink communication system information further includes indication information indicating the synchronization source selected by the user equipment, and
the indication information is indicated by at least one of an indication field in the sidelink communication system information, physical sidelink broadcast channel (PSBCH) scrambling or generation of scrambling sequences, and demodulation reference signal (DMRS) sequences for a PSBCH channel estimation.

2. The method according to claim 1, wherein the synchronization source comprises an evolved base station (eNB) or a new radio (NR) base station (gNB).

3. The method according to claim 2, wherein in a case that the synchronization source, indicated by indication information, is the eNB, the indication information further indicates that the sidelink TDD configuration information in the sidelink communication system information is interpreted based on Long Term Evolution (LTE) TDD configuration information.

4. The method according to claim 1, wherein the sidelink communication system information further includes indication information, and the indication information is used for the other user equipment that receives the sidelink communication system information to determine a priority for selecting the synchronization source.

5. The method according to claim 1, wherein the sidelink TDD configuration information includes one or two configuration patterns, and the one or two configuration patterns include:
at least one of a configuration periodicity and a starting subframe number or a slot number corresponding to the configuration periodicity, or
a number of subframes or slots of a sidelink resource.

6. The method according to claim 1, further comprising:
configuring a periodicity of a TDD configuration pattern based on a value of a configuration periodicity included in the TDD configuration information, wherein the value of the configuration periodicity includes 6 ms.

7. A user equipment, comprising:
at least one processor; and
at least one non-transitory computer-readable medium coupled to the at least one processor and storing one or more computer-executable instructions that, when executed by the at least one processor, cause the user equipment to:
receive system information from a base station, the system information including time division duplexing (TDD) configuration information;
select a synchronization source from a plurality of sources, including the base station and another user equipment, based on a priority criterion, wherein a priority of the base station is higher than a priority of the other user equipment;
transmit sidelink communication system information, including sidelink TDD configuration information, based on the synchronization source; and
perform a sidelink communication based on the synchronization source, wherein:
the sidelink communication system information further includes indication information indicating the synchronization source selected by the user equipment, and
the indication information is indicated by at least one of an indication field in the sidelink communication system information, physical sidelink broadcast channel (PSBCH) scrambling or generation of scrambling sequences, and demodulation reference signal (DMRS) sequences for a PSBCH channel estimation.

8. The user equipment according to claim 7, wherein the synchronization source comprises an evolved base station (eNB) or a new radio (NR) base station (gNB).

9. The user equipment according to claim 8, wherein in a case that the synchronization source indicated by indication information is the eNB, the indication information further indicates that the sidelink TDD configuration information in the sidelink communication system information is interpreted based on Long Term Evolution (LTE) TDD configuration information.

10. The user equipment according to claim 7, wherein the sidelink communication system information further includes indication information, and the indication information is used for the other user equipment that receives the sidelink communication system information to determine a priority for selecting the synchronization source.

11. The user equipment according to claim 7, wherein the sidelink TDD configuration information includes one or two configuration patterns, and the one or two configuration patterns include:
at least one of a configuration periodicity and a starting subframe number or a slot number corresponding to the configuration periodicity, or
a number of subframes or slots of a sidelink resource.

12. The user equipment according to claim 7, the operations further comprising:
configuring a periodicity of a TDD configuration pattern based on a value of a configuration periodicity included in the TDD configuration information, wherein the value of the configuration periodicity includes 6 ms.

* * * * *